(12) United States Patent
Yasue et al.

(10) Patent No.: US 11,992,973 B2
(45) Date of Patent: May 28, 2024

(54) KNEADING METHOD FOR FIBER-REINFORCED THERMOPLASTIC RESIN, PLASTICIZING DEVICE, AND EXTRUDING MACHINE

(71) Applicant: THE JAPAN STEEL WORKS, LTD., Tokyo (JP)

(72) Inventors: Akira Yasue, Hiroshima (JP); Hideki Chiba, Hiroshima (JP); Daisuke Kunihiro, Hiroshima (JP); Shoso Nishida, Hiroshima (JP); Kazuya Tsuji, Hiroshima (JP); Yasufumi Fujita, Hiroshima (JP); Kazuki Fujita, Hiroshima (JP); Yukihiro Sumihiro, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 428 days.

(21) Appl. No.: 16/650,784

(22) PCT Filed: Sep. 26, 2018

(86) PCT No.: PCT/JP2018/035815
§ 371 (c)(1),
(2) Date: Mar. 25, 2020

(87) PCT Pub. No.: WO2019/065786
PCT Pub. Date: Apr. 4, 2019

(65) Prior Publication Data
US 2021/0197420 A1   Jul. 1, 2021

(30) Foreign Application Priority Data

Sep. 26, 2017 (JP) .................................. 2017-184641
Oct. 6, 2017 (JP) .................................. 2017-195576

(51) Int. Cl.
*B29B 7/90* (2006.01)
*B29B 7/00* (2006.01)
(Continued)

(52) U.S. Cl.
CPC ............... *B29B 7/482* (2013.01); *B29B 7/007* (2013.01); *B29B 7/489* (2013.01); *B29B 7/603* (2013.01);
(Continued)

(58) Field of Classification Search
None
See application file for complete search history.

(56) References Cited

U.S. PATENT DOCUMENTS 4,439,387 A * 3/1984 Hawley ................. B29C 48/156
                                                           264/108
5,401,154 A    3/1995 Sargent
(Continued)

FOREIGN PATENT DOCUMENTS

CN    1248513 A    3/2000
CN    2690140 Y    4/2005
(Continued)

OTHER PUBLICATIONS

Perlman, Merril, Your Choice: Alternating between Alternatives, Vocabulary.com (Year: 2012).*
(Continued)

*Primary Examiner* — Armand Melendez
(74) *Attorney, Agent, or Firm* — Sughrue Mion, PLLC

(57) ABSTRACT

The present invention provides a kneading method for a fiber-reinforced thermoplastic resin with which dispersibility of reinforcement fibers is enhanced and sufficient reinforcement fibers having a proper fiber length remain, and a fiber-reinforced thermoplastic resin plasticizing device and an extruding machine for carrying out the method. The
(Continued)

(a)

(b)

kneading method comprises supplying a thermoplastic resin and reinforcement fibers into a cylinder of a plasticizing device, and rotating a screw to obtain a fiber-reinforced thermoplastic resin, wherein the size of a clearance between the bore of the cylinder and the screw is made different between an upstream side in the vicinity of a reinforcement fiber loading port and a downstream side, so that the clearance becomes larger from the vicinity of the reinforcement fiber loading port toward the downstream side compared with the upstream side.

10 Claims, 5 Drawing Sheets

(51) Int. Cl.
- *B29B 7/48* (2006.01)
- *B29B 7/60* (2006.01)
- *B29C 48/00* (2019.01)
- *B29C 48/16* (2019.01)
- *B29C 48/285* (2019.01)
- *B29C 48/40* (2019.01)
- *B29K 101/12* (2006.01)
- *B29K 105/12* (2006.01)

(52) U.S. Cl.
CPC .......... *B29B 7/905* (2013.01); *B29C 48/0022* (2019.02); *B29C 48/16* (2019.02); *B29C 48/2886* (2019.02); *B29C 48/297* (2019.02); *B29C 48/40* (2019.02); *B29C 48/0011* (2019.02); *B29K 2101/12* (2013.01); *B29K 2105/12* (2013.01)

(56) References Cited

U.S. PATENT DOCUMENTS

| | | | |
|---|---|---|---|
| 6,238,733 | B1 | 5/2001 | Therolf |
| 6,776,596 | B2* | 8/2004 | Brussel ............... B29B 17/0042 366/76.1 |
| 2003/0055154 | A1 | 3/2003 | Urata |
| 2006/0049541 | A1 | 3/2006 | Sutton et al. |
| 2006/0103045 | A1* | 5/2006 | O'Brien-Bernini ... E04F 13/083 264/45.9 |
| 2007/0194478 | A1 | 8/2007 | Aoki et al. |
| 2012/0081989 | A1* | 4/2012 | Yata ........................ B29C 48/41 366/75 |
| 2013/0079454 | A1 | 3/2013 | Sekimura et al. |
| 2014/0027937 | A1 | 1/2014 | Schwarz et al. |
| 2016/0089822 | A1* | 3/2016 | Oda ........................ B29B 7/845 264/328.18 |

FOREIGN PATENT DOCUMENTS

| | | |
|---|---|---|
| CN | 1942296 A | 4/2007 |
| CN | 101175619 A | 5/2008 |
| CN | 106827570 A | 6/2017 |
| DE | 20 2007 005 010 U1 | 6/2007 |
| EP | 2 987 603 A1 | 2/2016 |
| JP | 10-329190 A | 12/1998 |
| JP | H11-115005 A | 4/1999 |
| JP | 2003-12945 A | 1/2003 |
| JP | 2003-236831 A | 8/2003 |
| JP | 2008-132702 A | 6/2008 |
| JP | 2011-255652 A | 12/2011 |
| JP | 2013-71281 A | 4/2013 |
| JP | 2016-64607 A | 4/2016 |
| JP | 2017-105081 A | 6/2017 |
| WO | 99/56936 A1 | 11/1999 |
| WO | 2014/020532 A1 | 2/2014 |

OTHER PUBLICATIONS

Alternatively definition, dictionary.com (Year: 2022).*
Communication dated Jun. 2, 2021, from the European Patent Office in European Application No. 18861517.3.
Communication dated May 7, 2021, from The China National Intellectual Property Administration in Application No. 201880062003.4.
International Search Report issued Nov. 6, 2018 by the International Searching Authority in counterpart international Patent Application No. PCT/JP2018/035815.
Written Opinion issued Nov. 6, 2018 by the International Searching Authority in counterpart international Patent Application No. PCT/JP2018/035815.
Communication dated Jan. 8, 2021, issued by the Korean Intellectual Property Office in corresponding Korean Application No. 10-2020-7008607.

* cited by examiner

[FIG. 2]
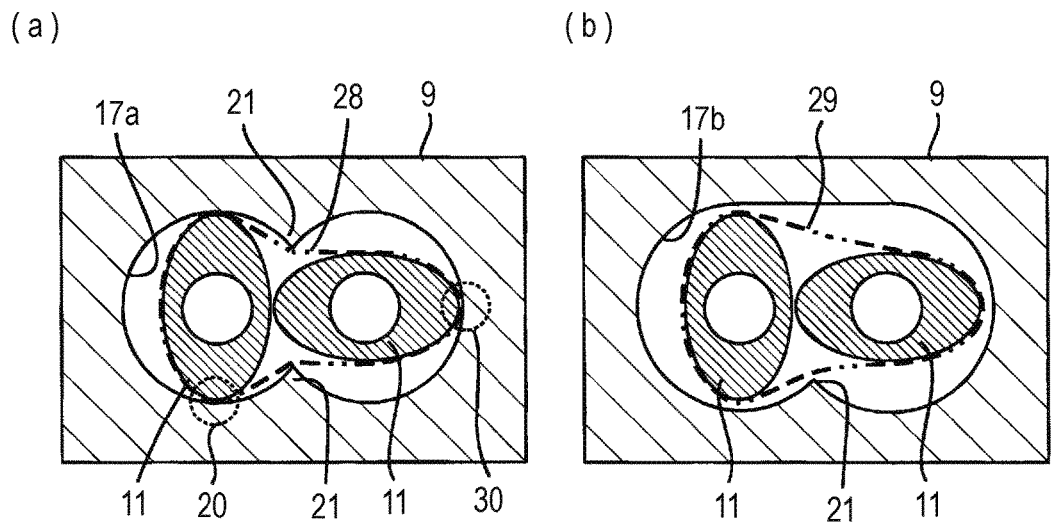
[FIG. 3]
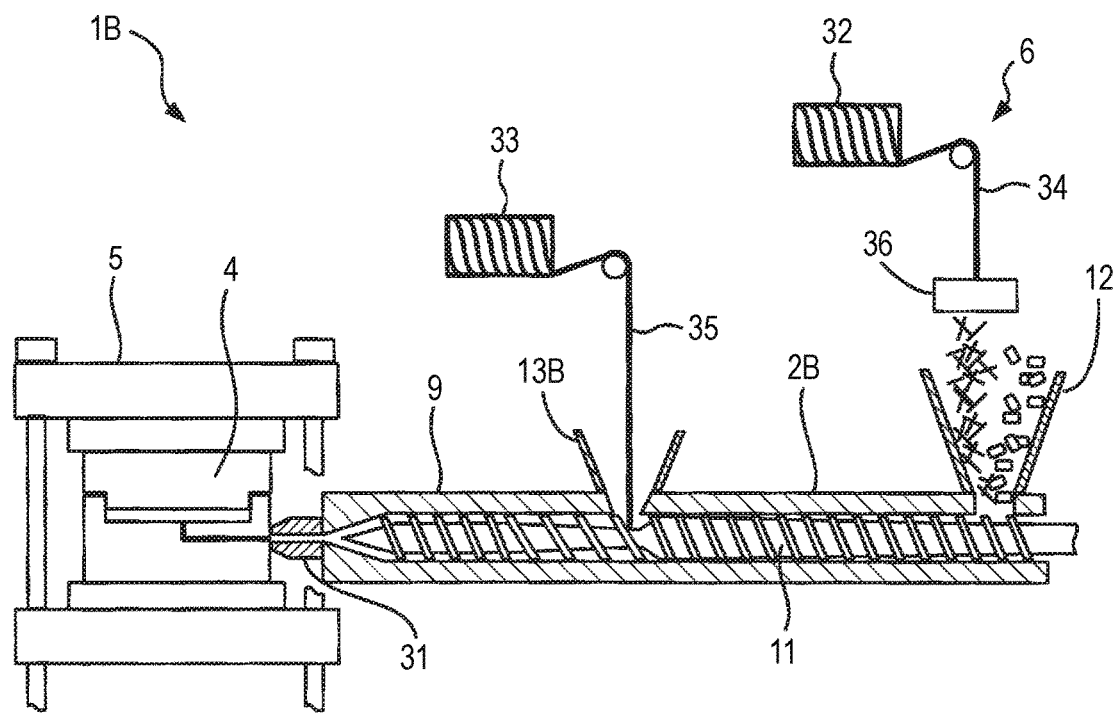

[FIG. 4]
(a)
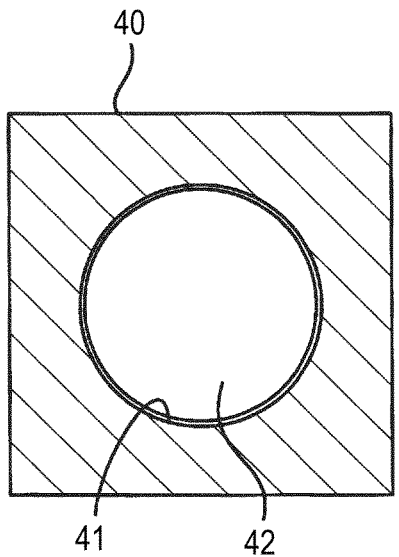
(b)
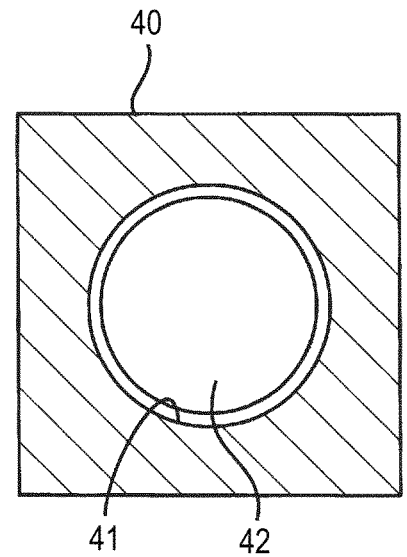

[FIG. 6]
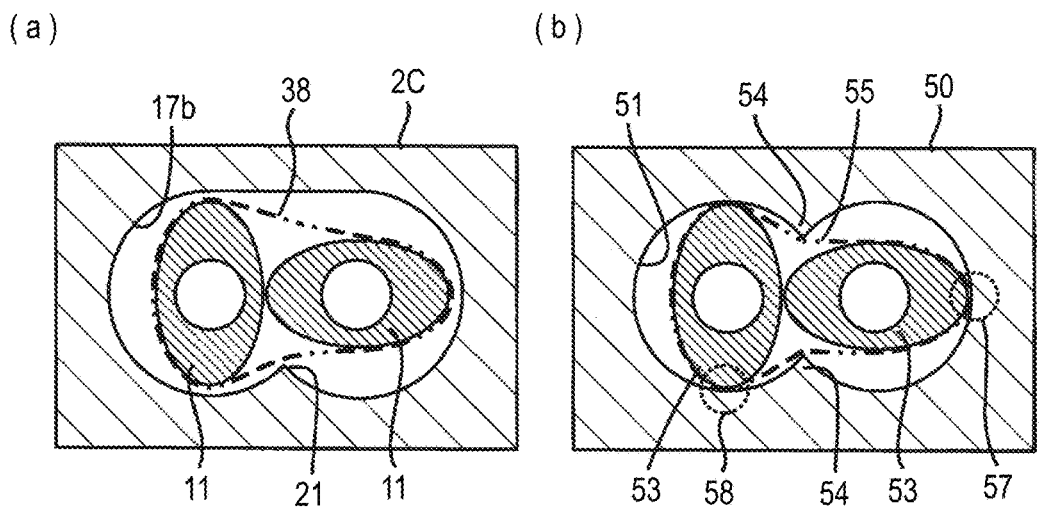
[FIG. 7]
[FIG. 8]

KNEADING METHOD FOR FIBER-REINFORCED THERMOPLASTIC RESIN, PLASTICIZING DEVICE, AND EXTRUDING MACHINE

CROSS REFERENCE TO RELATED APPLICATIONS

This application is a National Stage of International Application No. PCT/JP2018/035815 filed Sep. 26, 2018, claiming priority based on Japanese Patent Application No. 2017-184641 filed Sep. 26, 2017 and Japanese Patent Application No. 2017-195576 filed Oct. 6, 2017.

TECHNICAL FIELD

The present invention relates to a kneading method for obtaining a fiber-reinforced thermoplastic resin from a thermoplastic resin and reinforcing fibers such as carbon fibers and glass fibers by using a molding device which includes a cylinder and a screw (plasticizing device), such as an injection device of an injection molding machine or an extruder, and a fiber-reinforced thermoplastic resin plasticizing device and an extruder for performing the method.

BACKGROUND ART

Molded articles, which are formed of a fiber-reinforced thermoplastic resin including reinforcing fibers (such as carbon fibers and glass fibers) and a thermoplastic resin, have a large strength and can be used in various fields. The fiber-reinforced thermoplastic resin is obtained by performing kneading with a plasticizing device which includes a screw, such as an injection device of an injection molding machine or an extruder.

For example, in order to obtain a fiber-reinforced thermoplastic resin by an extruder, first, a resin pellet, which is a material of the thermoplastic resin, is supplied from a hopper of the extruder. The resin pellet is melted in a cylinder of the extruder and sent forward by a screw. Reinforcing fibers are supplied into the cylinder at a predetermined position of the cylinder. The reinforcing fibers are supplied as so-called roving. That is, several tens to several hundreds of the reinforcing fibers such as carbon fibers or glass fibers are bundled into strands, and several tens of the strands are twisted together to form a rough thread shape. Such roving is directly supplied to the cylinder or cut into a predetermined length and supplied to the cylinder. Then, molten resin and the reinforcing fibers are kneaded by rotation of the screw, and the reinforcing fibers are dispersed and cut as appropriate to obtain the fiber-reinforced thermoplastic resin. When the fiber-reinforced thermoplastic resin is extruded from a predetermined die provided at a tip end of the extruder, a lump intermediate molded article is obtained. When the lump intermediate molded article is conveyed to a compression die and subjected to compression molding, a molded article made of the fiber-reinforced thermoplastic resin is obtained.

PTL 1 describes a method in which reinforcing fibers provided as roving are opened and supplied when manufacturing a fiber-reinforced thermoplastic resin from a thermoplastic resin and reinforcing fibers. According to this literature, the term "open" refers to a process of continuously widening and thinning a reinforcing fiber bundle. As a specific opening method, the reinforcing fiber bundle may be stiffen by a round bar, applied with a water flow or high-pressure air flow, vibrated by ultrasonic vibration for loosening, or an opening device including an opening roller may be used to perform the method. That is, the reinforcing fibers which are bound to each other in a roving state are loosened by applying a physical force. In the method described in PTL 1, after the reinforcing fibers are opened in this manner, the reinforcing fibers are cut to a predetermined length to form cut reinforcing fibers. For example, in a case where an injection molding machine is used, the cut reinforcing fibers are supplied to a heating cylinder of an injection device. Then, the molten resin and the reinforcing fibers are kneaded in the heating cylinder to obtain the fiber-reinforced thermoplastic resin. In a method of related art in which the reinforcing fibers are put into the heating cylinder in the state of the reinforcing fiber bundle without being opened, the reinforcing fibers are easily broken or cut when an external force acting on the reinforcing fibers becomes uneven on an outer side and an inner side of the bundle during kneading with the resin. When the reinforcing fibers opened by the method described in PTL 1 is supplied and kneaded with the resin, the external force acting on the reinforcing fibers becomes even, so that the fibers are difficult to be cut. Therefore, a fiber-reinforced thermoplastic resin having an even fiber length distribution can be obtained.

CITATION LIST

Patent Literature

PTL 1: JP-A-2016-64607

SUMMARY OF INVENTION

Technical Problem

According to the method in the related art or the method described in PTL 1, the fiber-reinforced thermoplastic resin can be kneaded and obtained by a plasticizing device including a screw. A molded article can be obtained by directly injecting or extruding the fiber-reinforced thermoplastic resin to a mold-clamped die to obtain a lump intermediate molded article and then carrying the lump intermediate molded article into a molding die to perform compression molding. However, there are some points that need to be solved or improved.

The fiber-reinforced thermoplastic resin is required to have two points, one point is that the reinforcing fibers are evenly dispersed in the resin, and the other point is that a large number of reinforcing fibers having appropriate fiber lengths are remained. That is because a portion having weak strength may be generated in the molded article if dispersion of the reinforcing fibers is uneven and high strength cannot be achieved if the number of reinforcing fibers having appropriate fiber lengths is small. However, these two requirements are in conflict. Although kneading of the resin and the reinforcing fibers is performed by rotating the screw, for example, it is necessary to use a screw on which a large shear force is applied to increase dispersibility of the reinforcing fibers or to supply the reinforcing fibers from an upstream side of the cylinder for a relatively long time. At this time, the dispersibility of the reinforcing fibers increases and impregnation of the resin impregnated into the reinforcing fibers is also promoted. However, the reinforcing fibers are cut and a proportion of the reinforcing fibers which have appropriate fiber lengths decreases, and the strength of the molded article cannot be sufficiently obtained. Meanwhile, in order to remain a large number of reinforcing fibers having appropriate fiber lengths, reinforcing fibers may be supplied from a downstream side of the cylinder in which the shearing force during kneading may be reduced by devising a shape of the screw to make the kneading time relatively short. However, when the kneading is performed in this manner, the dispersion of the reinforcing fibers becomes insufficient, and the strength is not evenly exhibited in the obtained molded article. Neither the method of the related art nor the method described in PTL 1 can simultaneously satisfy these two requirements which are in conflict.

In the method described in PTL 1, since the reinforcing fibers provided as the roving are opened, supplied to the resin and kneaded, the external force acting on the reinforcing fibers during kneading with the resin becomes even as compared with a case where the reinforcing fibers are bundled. Accordingly, there is an excellent effect that a proportion of the reinforcing fibers which are cut by the uneven external force is reduced. However, the cause of the cutting of the reinforcing fibers during kneading the resin and the reinforcing fibers is not only due to the uneven external force acting on the fiber reinforcement, but also due to other causes. Specifically, the cutting is also caused by a shearing force and a tensile force generated when the resin and the reinforcing fibers are kneaded. That is, the cutting is not sufficiently prevented only by opening and supplying the reinforcing fibers as in the method described in PTL 1.

Therefore, an object of the present invention to provide a fiber-reinforced thermoplastic resin kneading method in which the dispersibility of the reinforcing fibers is improved while the reinforcing fibers having appropriate fiber lengths are sufficiently remained when a fiber-reinforced thermoplastic resin is obtained by mixing and kneading a thermoplastic resin with reinforcing fibers such as carbon fibers and glass fibers, and a plasticizing device for performing the kneading method.

Another object of the present invention is to provide an extruder for extruding a fiber-reinforced thermoplastic resin, in which reinforcing fibers having appropriate fiber lengths can be dispersed evenly with a sufficient proportion in the fiber-reinforced thermoplastic resin.

Solution to Problem

An aspect of the present invention is to provide a kneading method for obtaining a fiber-reinforced thermoplastic resin by a plasticizing device including a cylinder and a screw inserted into the cylinder, which includes supplying a thermoplastic resin and reinforcing fibers to the cylinder and rotating the screw. According to the present invention, the reinforcing fibers are supplied from a plurality of different locations in the cylinder when the reinforcing fibers are supplied into the cylinder. The plasticizing device is configured such that a clearance between a bore of the cylinder and the screw becomes larger on a downstream side than on an upstream side from a predetermined cylinder position, and at least one of the plurality of locations, from which the reinforcing fibers are supplied into the cylinder, is located downstream of the predetermined cylinder position, to supply the reinforcing fibers from the at least one of the plurality of locations downstream of the predetermined cylinder position. Further, in a section from one predetermined location to another location among the plurality of locations from which the reinforcing fibers are supplied into the cylinder, a shearing force is set to be larger than the other sections by a shape of the screw.

Another aspect of the present invention is to provide an extruder for extruding a fiber-reinforced thermoplastic resin obtained by supplying and melting a thermoplastic resin while supplying and kneading reinforcing fibers. A reinforcing fiber inlet to which the reinforcing fibers are supplied is provided in a cylinder of the extruder. A clearance between a bore of the cylinder and a screw becomes larger on a downstream side than on an upstream side from a position at or near the reinforcing fiber inlet.

That is, the present invention is characterized in the following (1) to (12).

(1) A fiber-reinforced thermoplastic resin kneading method for obtaining a fiber-reinforced thermoplastic resin by using a plasticizing apparatus, the plasticizing apparatus including a cylinder and a screw inserted into the cylinder, the method comprising: supplying a thermoplastic resin and reinforcing fibers to the cylinder and rotating the screw, wherein the reinforcing fibers are supplied from a plurality of different locations in the cylinder when the reinforcing fibers are supplied into the cylinder.

(2) The fiber-reinforced thermoplastic resin kneading method according to the above (1), wherein the plasticizing apparatus is configured such that a clearance between a bore of the cylinder and the screw becomes larger on a downstream side than on an upstream side from a predetermined cylinder position, and at least one of the plurality of locations, from which the reinforcing fibers are supplied into the cylinder, supplies from the downstream side of the predetermined cylinder position.

(3) The fiber-reinforced thermoplastic resin kneading method according to the above (1) or (2), wherein in a section from one predetermined location to another location among the plurality of locations from which the reinforcing fibers are supplied into the cylinder, a shearing force is set to be larger than that in another section by a shape of the screw.

(4) A fiber-reinforced thermoplastic resin plasticizing apparatus comprising: a cylinder; and a screw rotatable in the cylinder, wherein a thermoplastic resin is supplied to the cylinder and melted while reinforcing fibers are supplied, and the thermoplastic resin and reinforcing fibers are kneaded to obtain a fiber-reinforced thermoplastic resin, and wherein the cylinder comprises reinforcing fiber inlets, into which the reinforcing fibers are input, at a plurality of locations in the cylinder, and the reinforcing fibers are input from the plurality of locations in parallel.

(5) The fiber-reinforced thermoplastic resin plasticizing apparatus according to the above (4), wherein a clearance between a bore of the cylinder and the screw becomes larger on a downstream side than on an upstream side from a predetermined location among the plurality of locations of the reinforcing fiber inlets.

(6) The fiber-reinforced thermoplastic resin plasticizing apparatus according to the above (4), wherein the plasticizing apparatus comprises a twin screw extruder having two screws, wherein a bore of the cylinder has a cross-sectional shape in which two circles of a same size partially overlap each other, thereby forming inward barrel chips at two locations of the bore, and wherein on a downstream side from one predetermined location among the plurality of locations of the reinforcing fiber inlets, the bore has a shape in which at least one of the barrel chips is cut.

(7) The fiber-reinforced thermoplastic resin plasticizing apparatus according to any one of the above (4) to (6), wherein in a section between the reinforcing fiber inlet located at one predetermined location and the reinforcing fiber inlet located at another one location, a flight, which has a larger shearing force during kneading as compared with another section, is formed in the screw.

(8) A fiber-reinforced thermoplastic resin extruder comprising: a cylinder; and a screw rotatable in the cylinder, wherein a thermoplastic resin is supplied to the cylinder and melted while reinforcing fibers are supplied, the thermoplastic resin and the reinforcing fibers are kneaded to obtain a fiber-reinforced thermoplastic resin, and the obtained fiber-reinforced thermoplastic resin is extruded by the extruder, wherein the cylinder includes a reinforcing fiber inlet, to which the reinforcing fibers are supplied, at a predetermined position in the cylinder, and wherein a clearance between a bore of the cylinder and the screw becomes larger on a downstream side than on an upstream side from a position at or near the reinforcing fiber inlet.

(9) A fiber-reinforced thermoplastic resin extruder, which is a twin screw extruder comprising: a cylinder having a bore, the bore having a cross-sectional shape in which two circles of a same size are partially overlapped with each other, thereby forming inward barrel chips at two locations; and two screws rotatably inserted into the bore, wherein a thermoplastic resin is supplied to the cylinder and melted while reinforcing fibers are supplied, the thermoplastic resin and the reinforcing fibers are kneaded to obtain a fiber-reinforced thermoplastic resin, and the obtained fiber-reinforced thermoplastic resin is extruded by the extruder, wherein the cylinder includes a reinforcing fiber inlet, to which the reinforcing fibers are supplied, at a predetermined position in the cylinder, and wherein on a downstream side from a position at or near the reinforcing fiber inlet, the bore has a shape in which at least one of the barrel chips is cut.

(10) The fiber-reinforced thermoplastic resin extruder according to the above (9), wherein a clearance between the bore of the cylinder and the screw becomes larger on a downstream side than on an upstream side from a position at or near the reinforcing fiber inlet.

(11) The fiber-reinforced thermoplastic resin extruder according to any one of the above (8) to (10), wherein a section at or near the reinforcing fiber inlet of the cylinder is a starvation section in which resin pressure decreases.

(12) The fiber-reinforced thermoplastic resin extruder according to any one of the above (8) to (11), wherein the extruder comprises cutting means, wherein the reinforcing fibers are cut into a predetermined length by the cutting means and supplied to the reinforcing fiber inlet.

Advantageous Effects of Invention

As described above, an aspect of the present invention is to provide the kneading method for obtaining the fiber-reinforced thermoplastic resin by the plasticizing device including the cylinder and the screw inserted into the cylinder, which includes supplying the thermoplastic resin and the reinforcing fibers to the cylinder and rotating the screw. The reinforcing fibers are supplied from the plurality of different locations in the cylinder when the reinforcing fibers are supplied into the cylinder. Since the reinforcing fibers supplied on the upstream side are kneaded over a long distance and subjected to a shearing force, the fibers cut by the kneading are slightly increased, while the reinforcing fibers can be evenly dispersed in the resin. Meanwhile, since the reinforcing fibers supplied on the downstream side can be kneaded only for a short distance, the dispersion in the resin may become insufficient, while the cutting caused by the kneading can be reduced. That is, a large proportion of reinforcing fibers having appropriate fiber lengths can be left. As a result, relatively short reinforcing fibers are evenly dispersed in the resin, while a predetermined proportion of relatively long fibers are contained. That is, both of the two requirements which are considered to be in conflict can be satisfied. That is, the reinforcing fibers are evenly dispersed in the fiber-reinforced thermoplastic resin, while a large number of reinforcing fibers having appropriate fiber lengths are remained. Even though the reinforcing fibers are relatively short, a certain degree of strength is exhibited, and a sufficiently large strength is exhibited if the fiber length is appropriate. Accordingly, when a molded article is molded from such a fiber-reinforced thermoplastic resin, a molded article, which has high strength as a whole while reducing unevenness in strength distribution depending on locations, can be obtained.

According to another aspect of the present invention, the plasticizing device is configured such that the clearance between the bore of the cylinder and the screw becomes larger on the downstream side than on the upstream side from the predetermined cylinder position, and at least one of the plurality of locations, from which the reinforcing fibers are supplied into the cylinder, is located downstream of the predetermined cylinder position, to supply the reinforcing fibers from the at least one of the plurality of locations downstream of the predetermined cylinder position. In this way, cutting of the reinforcing fibers supplied from the at least one of the plurality of locations downstream of the predetermined cylinder position can be sufficiently reduced. Accordingly, a sufficient proportion of the reinforcing fibers having the appropriate fiber length are remained in the resin.

Further, according to still another aspect of the present invention, in the section from the one predetermined location to the other location among the plurality of locations from which the reinforcing fibers are supplied into the cylinder, the shearing force is set to be larger than the other sections by the shape of the screw. In this way, the reinforcing fibers can be forcibly dispersed in the resin in this section.

Another aspect of the present invention is an extruder which includes a cylinder and a screw which rotates in the cylinder. A thermoplastic resin is supplied to the cylinder and melted while reinforcing fibers are supplied and kneaded to obtain a fiber-reinforced thermoplastic resin, and the obtained fiber-reinforced thermoplastic resin is extruded by the extruder. A reinforcing fiber inlet, to which the reinforcing fibers are supplied, is provided at a predetermined position in the cylinder. According to the present invention, a clearance between a bore of the cylinder and the screw becomes larger on a downstream side than on an upstream side from a position at or near the reinforcing fiber inlet. Since the clearance between the bore and the screw is larger on the downstream side where the reinforcing fibers are input and kneaded with molten resin, cutting of the reinforcing fibers can be reduced to some extent. Accordingly, even when the fiber-reinforced thermoplastic resin is kneaded with a large shearing force to increase the dispersion of the reinforcing fibers, the number of cut reinforcing fibers is reduced. That is, according to the present invention, a sufficient proportion of the reinforcing fibers having the appropriate fiber lengths can be dispersed evenly.

Another aspect of the present invention is a twin screw extruder including: a cylinder which includes a bore having a cross-sectional shape in which two circles of a same size partially overlap each other, and thereby forming inward barrel chips at two locations; and two screws which are rotatably inserted into the bore. A thermoplastic resin is supplied to the cylinder and melted while reinforcing fibers are supplied and kneaded to obtain a fiber-reinforced thermoplastic resin, and the obtained fiber-reinforced thermoplastic resin is extruded by the twin screw extruder. A reinforcing fiber inlet to which the reinforcing fibers are supplied is provided at a predetermined position in the cylinder, and the bore has a shape in which at least one of the barrel chips is cut on a downstream side from a position at or near the reinforcing fiber inlet. When the reinforcing fibers and the thermoplastic resin are kneaded by the twin screws, the reinforcing fibers are easily cut in the barrel chips. In the present invention, since at least one barrel chip is cut on the downstream side from a position at or near the reinforcing fiber inlet, an effect of reducing the cutting of the reinforcing fibers can be obtained.

Further, according to still another aspect of the invention, a section at or near the reinforcing fiber inlet of the cylinder is a starvation section in which resin pressure decreases. In this way, the reinforcing fibers can be easily supplied into the cylinder.

Further, according to still another aspect of the invention, the extruder includes a cutting unit. The reinforcing fibers are cut into a predetermined length by the cutting unit and supplied to the reinforcing fiber inlet. This ensures that the fiber length of the reinforcing fibers is within an appropriate range.

BRIEF DESCRIPTION OF DRAWINGS

FIG. 1(a) is a front view showing a partial cross-section of the molding device, and FIGS. 1(b) and 1(c) are cross-sectional views of a twin screw extruder constituting the molding device according to the first embodiment taken along X-X and Y-Y in FIG. 1(a), respectively.

FIGS. 2(a) and 2(b) show a state in which reinforcing fibers and a thermoplastic resin are kneaded in the twin screw extruder, FIG. 2(a) is a cross-sectional view of an upstream side of the twin screw extruder, and FIG. 2(b) is a cross-sectional view of a downstream side of the twin screw extruder.

FIG. 3 is a front view showing a partial cross-section of a molding device according to a second embodiment of the present invention.

FIGS. 4(a) and 4(b) are cross-sectional views of a single screw extruder according to another embodiment of the present invention, FIG. 4(a) is a cross-sectional view of an upstream side of the extruder, and FIG. 4(b) is a cross-sectional view of a downstream side of a reinforcing fiber inlet.

FIG. 5(a) is a front view showing a partial cross-section of the molding device, and FIGS. 5(b) and 5(c) are cross-sectional views of a twin screw extruder constituting the molding device according to the third embodiment taken along X-X and Y-Y in FIG. 5(a), respectively.

FIGS. 6(a) and 6(b) show a state in which reinforcing fibers and a thermoplastic resin are kneaded in the twin screw extruder, FIG. 6(a) is a cross-sectional view of the twin screw extruder used in the third embodiment of the present invention, and FIG. 6(b) is a cross-sectional view of a twin screw extruder in the related art.

FIG. 7 is a photograph of carbon fibers contained in a molded article molded by the molding device according to the third embodiment of the present invention.

FIG. 8 is a photograph of carbon fibers contained in a molded article molded by a molding device according to the related art.

DESCRIPTION OF EMBODIMENTS

An embodiment of the present invention will be described below.

In the present specification, "up" and "down" mean to be upper and lower in a gravity direction, "down" means the gravity direction, and "up" means a direction opposite to the gravity direction.

First Embodiment

Figure 1:
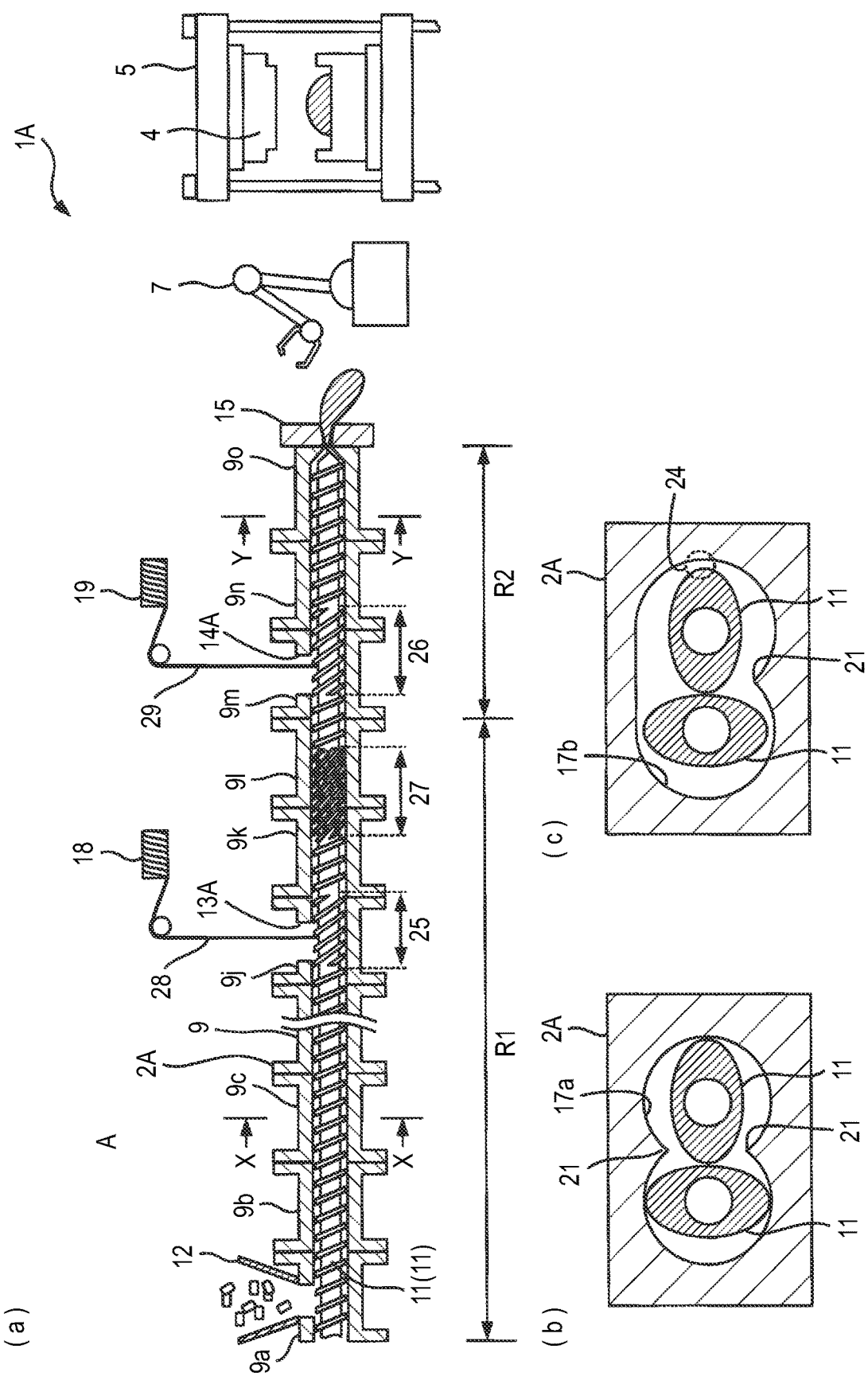
FIGS. 1(a) to 1(c) show a molding device according to a first embodiment of the present invention.

A molding device 1A according to a first embodiment as shown in FIG. 1(a) is configured by a plasticizing device for obtaining a fiber-reinforced thermoplastic resin by kneading a thermoplastic resin and reinforcing fibers. That is, the molding device 1A according to the first embodiment includes: a twin screw extruder 2A according to the present embodiment; a molding die 4 for obtaining a molded article by compression-molding a lump intermediate molded article extruded from the twin screw extruder 2A; a mold clamping device 5 for clamping the molding die 4; and a robot arm 7 for conveying the lump intermediate molded article extruded from the twin screw extruder 2A to the molding die 4.

Similarly to a twin screw extruder in the related art, the twin screw extruder 2A according to the present embodiment also includes: a cylinder 9 formed by connecting a plurality of cylinder blocks 9a, 9b, . . . ; and two screws 11, 11 inserted into the cylinder 9. A hopper 12 is provided upstream of the cylinder 9, that is, on a rear end portion of the cylinder 9, so as to supply a thermoplastic resin pellet. Reinforcing fibers are also supplied to the cylinder 9, and the thermoplastic resin and the reinforcing fibers are kneaded by the screws 11, 11 to obtain a fiber-reinforced thermoplastic resin. A predetermined die 15, from which the fiber-reinforced thermoplastic resin is extruded, is provided at a tip end of the cylinder 9, and a cutter (not shown), which cuts the extruded fiber-reinforced thermoplastic resin into a predetermined size, is connected to the die 15. As a result, a lump intermediate molded article can be obtained. A plurality of heaters which are not shown in FIG. 1(a) are provided on an outer peripheral surface of the cylinder 9 to heat the cylinder 9.

The twin screw extruder 2A according to the present embodiment is characterized in that two reinforcing fiber supply openings are provided with a predetermined interval therebetween in an axial direction. That is, a first reinforcing fiber inlet 13A and a second reinforcing fiber inlet 14A are provided. In the present embodiment, the first reinforcing fiber inlet 13A is provided in a cylinder block 9j which is close to a center of the cylinder 9, and the second reinforcing fiber inlet 14A is provided in a cylinder block 9m which is close to a tip end of the cylinder 9. Reinforcing fiber rolls 18, 19 are connected to the first and second reinforcing fiber inlets 13A, 14A, and a rope-shaped reinforcing fiber bundle, namely roving (reinforcing fibers 28, 29) is drawn out from the reinforcing fiber rolls 18, 19 and supplied to the first and second reinforcing fiber inlets 13A, 14A.

The twin screw extruder 2A according to the present embodiment is also characterized by bores 17a, 17b of the cylinder 9 in which the screws 11, 11 are inserted. The bore 17a is formed in the same shape as a bore of the twin screw extruder in the related art on a side upstream of the second reinforcing fiber inlet 14A, that is, in a section indicated by reference symbol R1 in FIG. 1(a). However, the bore 17b is formed in a shape different from the bore of the twin screw extruder in the related art on a downstream side from a position at or near the second reinforcing fiber inlet 14A, that is, in a section indicated by reference symbol R2. This point will be described. First, in the section of the reference symbol R1, as shown in FIG. 1(b), the bore 17a has a cross-sectional shape in which two horizontally-arranged circles having the same size partially overlap with each other. As a result, the bore 17a is formed with inward protrusions, that is, barrel chips 21, 21, at two locations on an upper side and a lower side thereof, respectively. The two screws 11, 11 are inserted into the bore 17a having such a shape. On the other hand, in the section of the reference symbol R2, as shown in FIG. 1(c), the bore 17b has a shape in which the upper barrel chip 21 is cut, and an upper portion of the upper barrel chip 21 has a planar shape. Diameters of two partially overlapping circles thereof are slightly larger than the two circles of the bore 17a shown in FIG. 1(b). Accordingly, a clearance 24 between the bore 17b and the screws 11, 11 is larger than on the upstream side.

The twin screw extruder 2A according to the present embodiment is also characterized by flight shapes of the screws 11, 11. First, flights are formed in the screws 11, 11 at or near the first reinforcing fiber inlet 13A and the second reinforcing fiber inlet 14A such that a transport force in these sections is larger as compared with other sections. Since the transport force is large, starvation sections 25, 26 where resin pressure is reduced are formed at or near the first and second reinforcing fiber inlets 13A, 14A. As for shapes of the flights in the starvation sections 25, 26, for example, a depth of a groove between the flights may be increased or a width of the flights may be reduced. In the present embodiment, a pitch of the flights is set to be larger than other portions so as to enhance the transport force. In the present embodiment, the screws 11, 11 are double flights in the starvation sections 25, 26.

In the present embodiment, the screws 11, 11 are also characterized in that a kneading section 27 for enhancing action of the kneading is provided in a section sandwiched between the first reinforcing fiber inlet 13A and the second reinforcing fiber inlet 14A. Although a mixing flight is provided in the kneading section 27 in the present embodiment, a kneading flight can also be provided, for example.

In the present embodiment, the molding die 4 is a die for molding a molded article by compression molding. The mold clamping device 5 for clamping the molding die 4 performs the mold-clamping by a toggle mechanism or a mold-clamping cylinder.

A molding method of obtaining a fiber-reinforced thermoplastic resin and molding a molded article by the molding device 1A according to the present embodiment will be described. In the twin screw extruder 2A according to the present embodiment, the screws 11, 11 are rotated to supply thermoplastic resin pellets from the hopper 12. The pellets are melted in the cylinder 9 and sent forward. Pressure of molten resin is reduced in the starvation section 25. Roving drawn out from the reinforcing fiber roll 18, namely the reinforcing fiber 28 is supplied into the cylinder 9 through the first reinforcing fiber inlet 13A. Since the resin pressure is reduced by the starvation section 25, the supply of the reinforcing fiber can be easily performed. When the reinforcing fiber 28 is supplied into the cylinder 9 and kneaded by rotation of the screws 11, 11, a part of the reinforcing fiber 28 is wound around the two screws 11, 11 as shown in FIG. 2(a). The reinforcing fiber 28 is pressed by the barrel chips 21, 21 and applied with strong tension, and friction acts between the bore 17a of the cylinder 9 and the screws 11, 11, as indicated by reference numerals 20, 30. Accordingly, the reinforcing fiber 28 is cut by these actions. The reinforcing fiber 28 is also cut due to a shearing force generated by kneading with the resin, and relatively short reinforcing fibers are evenly dispersed in the resin.

The fiber-reinforced thermoplastic resin is further kneaded strongly by the kneading section 27, and dispersibility of the reinforcing fibers is further enhanced. When the fiber-reinforced thermoplastic resin is sent to the starvation section 26, the resin pressure is reduced again. Roving drawn out from the reinforcing fiber roll 19, namely the reinforcing fiber 29 is supplied into the cylinder 9 through the second reinforcing fiber inlet 14A. In a section indicated by reference symbol R2, a clearance between the bore 17b of the cylinder 9 and the screws 11, 11 is increased, and the barrel chip 21 is provided only on a lower side. As shown in FIG. 2(b), although a part of the reinforcing fiber 29 supplied from the second reinforcing fiber inlet 14A is wound around the screws 11, 11, tension acting on the reinforcing fiber 29 is small, and friction is hardly applied since the clearance between the bore 17b and the screw 11 is large. That is, the reinforcing fiber 29 is difficult to be cut. Although the reinforcing fiber 29 is cut by the shearing force generated by the kneading, the reinforcing fiber 29 is not cut too finely. In this way, reinforcing fibers having appropriate fiber lengths are remained sufficiently in the fiber-reinforced thermoplastic resin. That is, in the fiber-reinforced thermoplastic resin obtained by the twin screw extruder 2A according to the present embodiment, relatively short reinforcing fibers are evenly dispersed while reinforcing fibers having appropriate fiber lengths are sufficiently contained.

As shown in FIG. 1(a), a predetermined amount of the fiber-reinforced thermoplastic resin is extruded from the die 15 and cut by a predetermined cutter. In this way, a lump intermediate molded article is obtained. The lump intermediate molded article is gripped by the robot arm 7, and is carried into a cavity of the molding die 4 whose mold is opened. The mold clamping device 5 is driven to perform compression molding. When the mold is opened after cooling and solidification, a molded article is obtained.

Second Embodiment

A fiber-reinforced thermoplastic resin kneading method of a second embodiment is characterized in that the reinforcing fibers are supplied from two or more different locations when the reinforcing fibers are supplied to the plasticizing device as in the first embodiment. The kneading method according to the present invention can also be performed using an injection device of an injection molding machine which serves as the plasticizing device.

FIG. 3 shows a molding device 1B according to the second embodiment, that is, an injection molding machine. An injection device 2B of the injection molding machine, that is, a plasticizing device, includes the cylinder 9 and the screw 11 which is driven in an axial direction and a rotation direction in the cylinder 9. The hopper 12 is provided at a rear end portion of the cylinder 9, and a reinforcing fiber inlet 13B is provided near a tip end portion. A clearance between a bore of the cylinder 9 and the screw 11 becomes larger on the downstream side than on the upstream side from a position at or near the reinforcing fiber inlet 13B. The screw 11 includes a deeper flight groove on the downstream side from a position at or near the reinforcing fiber inlet 13B, and a starvation section, in which resin pressure is reduced, is thus formed. An injection nozzle 31 is provided at the tip end of the cylinder 9, and abuts against a sprue of the molding die 4 which is mold-clamped by the mold clamping device 5. In the molding device 1B according to the second embodiment, the hopper 12 not only supplies the thermoplastic resin pellets but also supplies reinforcing fibers. A reinforcing fiber supply device 6 is provided corresponding to the hopper 12, and the reinforcing fiber supply device 6 includes a reinforcing fiber roll 32 and a cutting device 36. Roving drawn out from the reinforcing fiber roll 32, namely the reinforcing fiber 34 is cut by the cutting device 36 and supplied from the hopper 12 into the cylinder 9. Although not shown in the drawings, a predetermined feeder is provided in the hopper 12, and the thermoplastic resin pellets and the reinforcing fibers are supplied into the cylinder 9 at a constant ratio.

When the screw 11 is rotated, the pellets and the reinforcing fibers supplied from the hopper 12 are sent forward, the pellets are melted and kneaded together with the reinforcing fibers while the reinforcing fibers are cut by the shearing force. That is, a fiber-reinforced thermoplastic resin in which relatively short reinforcing fibers are evenly dispersed is obtained. Such a fiber-reinforced thermoplastic resin is sent to the starvation section by the screw 11 to reduce the resin pressure. Roving drawn out from the reinforcing fiber roll 33, namely the reinforcing fiber 35 is supplied into the cylinder 9 through the reinforcing fiber inlet 13B. Although the reinforcing fibers supplied here are also cut to some extent by the shearing force of the kneading, reinforcing fibers having appropriate fiber lengths are remained sufficiently. That is, the fiber-reinforced thermoplastic resin, in which the relatively short reinforcing fibers are evenly dispersed while the reinforcing fibers having the appropriate fiber lengths are sufficiently contained, is weighed. The molding die 4 is mold-clamped by the mold clamping device 5, and the screw 11 is driven to inject the fiber-reinforced thermoplastic resin. When the mold is opened after cooling and solidification, a molded article is obtained.

The molding device 1A according to the first embodiment and the molding device 1B according to the second embodiment may be modified in various ways. For example, although the number of the reinforcing fiber inlets is two in the description above, three or more inlets may be provided. The reinforcing fibers may be supplied as roving directly, or may be supplied after being cut. Further, it is also conceivable to adopt pellets containing reinforcing fibers as the pellets supplied from the hopper 12. In this case, if the reinforcing fibers are further supplied from another location in the cylinder 9, the reinforcing fibers are substantially supplied from two locations. That is, the reinforcing fibers are supplied from two different locations in the cylinder 9. In this way, the fiber-reinforced thermoplastic resin, in which the relatively short reinforcing fibers are evenly dispersed while the reinforcing fibers having the appropriate fiber lengths are sufficiently contained, is obtained. That is, the fiber-reinforced thermoplastic resin kneading method according to the present invention can be performed.

In the molding device 1A according to the first embodiment and the molding device 1B according to the second embodiment, the bore of the twin screw extruder 2A and the injection device 2B may also be modified. For example, it has been described in the first embodiment that the clearance between the bore 17b and the screws 11, 11 of the twin screw extruder 2A is larger on the downstream side than on the upstream side from a position at or near the second reinforcing fiber inlet 14A, and at least one of the upper and lower barrel chips 21, 21 is removed from downstream at or near the second reinforcing fiber inlet 14A. However, the clearance between the bores 17a, 17b and the screws 11, 11 may be constant, and the barrel chips 21, 21 may not be removed. In this case, although the reinforcing fibers introduced from the second reinforcing fiber inlet 14A are easily cut, a kneading time thereof is shorter as compared with the reinforcing fibers supplied from the first reinforcing fiber inlet 13A, so that the reinforcing fibers having the appropriate fiber lengths are remained sufficiently. Alternatively, a modification may also be made in away opposite to such a modification. That is, the clearance between the bore 17b and the screws 11, 11 may be larger on the downstream side from a position at or near the second reinforcing fiber inlet 14A, and both of the upper and lower barrel chips 21, 21 may be removed. In this case, the cutting of the reinforcing fibers supplied from the second reinforcing fiber inlet 14A is further reduced. In the first and second embodiments, the clearance between the bore of the cylinder and the screw, which is increased on the downstream side from a position at or near the reinforcing fiber inlet, may also be reduced from a predetermined downstream position. In this case, although the reinforcing fibers are easily cut as approaching the tip end portion of the cylinder, dispersibility of the relatively short reinforcing fibers dispersed in the fiber-reinforced thermoplastic resin is improved, and the reinforcing fibers introduced at a later stage can be easily adjusted to have appropriate fiber lengths.

In the fiber-reinforced thermoplastic resin kneading methods according to the first and second embodiments, a single screw extruder can also be used as the plasticizing device. Even when the methods are performed by the single screw extruder, the reinforcing fibers may be supplied from two or more different locations in the cylinder. In a case where the reinforcing fibers are supplied from two locations in the cylinder, it is preferable that a clearance between a bore 41 of a cylinder 40 and a screw 42 is reduced on the upstream side with respect to a most downstream supply location as shown in FIG. 4(a), and the clearance between the bore 41 of the cylinder 40 and the screw 42 is increased on the downstream side as shown in FIG. 4(b). In this way, the reinforcing fibers supplied on the upstream side of the extruder are cut by kneading with the resin and dispersed evenly in the fiber-reinforced thermoplastic resin, and the reinforcing fibers supplied on the downstream side are hardly cut, thus reinforcing fibers having the appropriate lengths are remained sufficiently.

Third Embodiment

Figure 5:
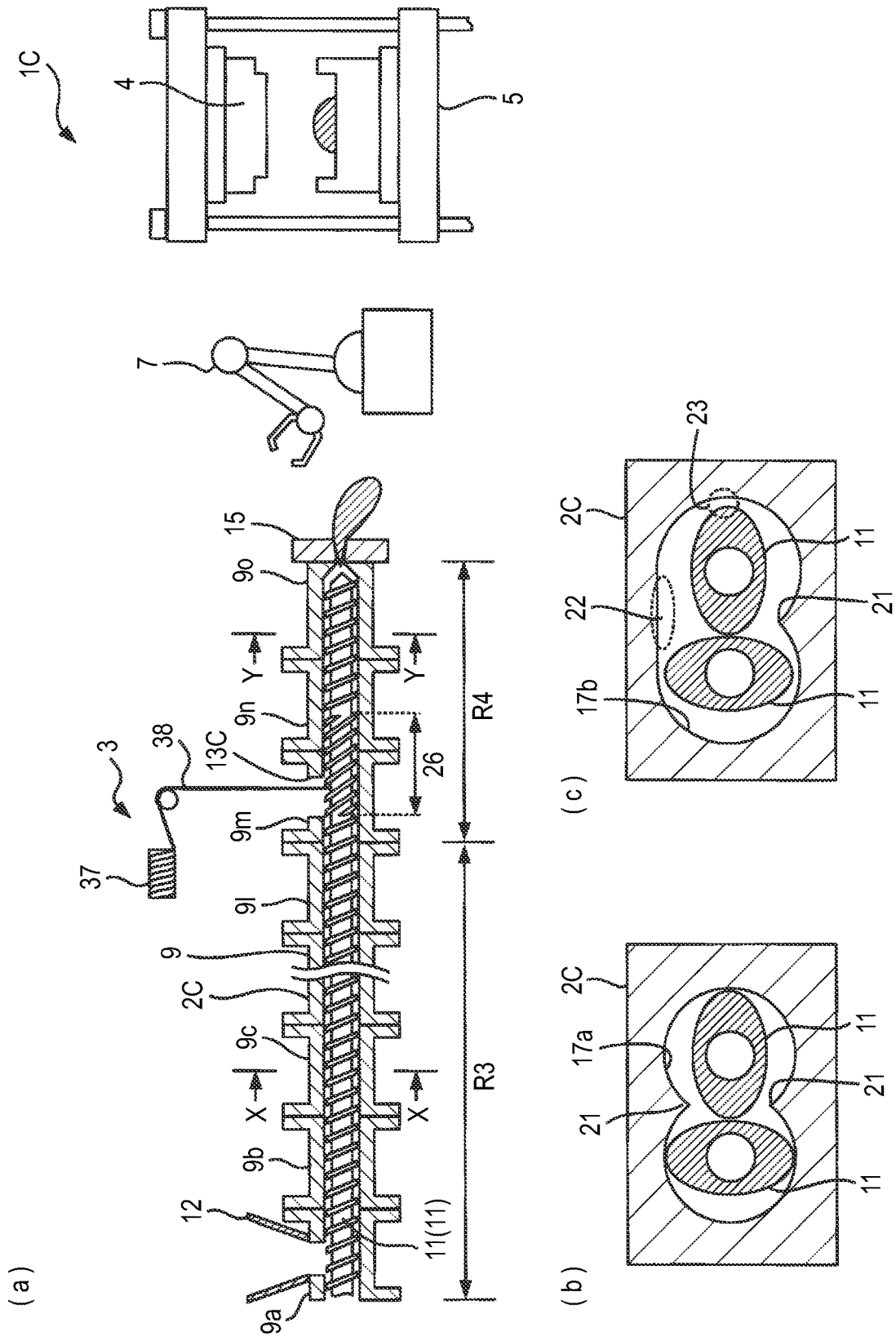
FIGS. 5(a) to 5(c) show a molding device according to a third embodiment of the present invention.

A molding device 1C according to a third embodiment as shown in FIG. 5(a) includes: a twin screw extruder 2C according to the present embodiment which is configured to obtain a fiber-reinforced thermoplastic resin by plasticizing a thermoplastic resin, kneading with reinforcing fibers and extruding the same as a lump molded article; a reinforcing fiber supply device 3 for supplying the reinforcing fibers to the twin screw extruder 2C; the molding die 4 for obtaining a molded article by compression-molding the lump molded article; the mold clamping device 5 for clamping the molding die 4; and a robot arm 7 for conveying the lump molded article extruded from the twin screw extruder 2C to the molding die 4.

Similarly to the twin screw extruder in the related art, the twin screw extruder 2C according to the present embodiment also includes: the cylinder 9 formed by connecting the plurality of cylinder blocks 9a, 9b, . . . ; and the two screws 11, 11 inserted into the cylinder 9. The hopper 12 for supplying the thermoplastic resin is provided on the upstream side, namely on the rear end portion of the cylinder 9, and a reinforcing fiber inlet 13C to which the reinforcing fibers are supplied is provided on the downstream side of the cylinder 9. In the twin screw extruder for kneading the fiber-reinforced thermoplastic resin in the related art, the reinforcing fiber inlet is provided at a predetermined position of the cylinder, while in the twin screw extruder 2C according to the present embodiment, the reinforcing fiber inlet 13C is provided as close to the tip end of the cylinder as possible, and thus a section where the reinforcing fibers are cut by kneading is shortened. The predetermined die 15 is provided at the tip end of the cylinder 9, and the fiber-reinforced thermoplastic resin is extruded by the twin screw extruder 2C. Although not shown in the drawings, a predetermined cutter is provided in relation to the die 15, and the fiber-reinforced thermoplastic resin is cut to obtain a lump intermediate molded article when a predetermined amount of the fiber-reinforced thermoplastic resin is extruded. A plurality of heaters which are not shown in FIG. 5(a) are provided on the outer peripheral surface of the cylinder 9 to heat the cylinder 9.

The twin screw extruder 2C according to the present embodiment is characterized by the bores 17a, 17b of the cylinder 9 in which the screws 11, 11 are inserted. The bore 17a is formed in the same shape as the bore of the twin screw extruder in the related art on the side upstream of the reinforcing fiber inlet 13C, that is, in a section indicated by reference symbol R3 in FIG. 5(a). However, the bore 17b is formed in a shape different from the bore of the twin screw extruder in the related art on the downstream side from a position at or near the reinforcing fiber inlet 13C, that is, in a section indicated by reference symbol R4. First, in the section of the reference symbol R3, as shown in FIG. 5(b), the bore 17a has a shape in which two horizontally-arranged circles having the same size partially overlap with each other. As a result, the bore 17a is formed with inward protrusions, that is, the barrel chips 21, 21, at two locations on the upper side and the lower side thereof, respectively. The two screws 11, 11 are inserted into the bore 17a having such a shape. On the other hand, in the section of the reference symbol R4, as shown in FIG. 5(c), the bore 17b has a shape in which the upper barrel chip 21 is cut, and an upper surface of the bore 17b has a planar shape as indicated by reference numeral 22. Diameters of two partially overlapping circles thereof are slightly larger than the two circles of the bore 17a shown in FIG. 5(b). Accordingly, a clearance as indicated by reference numeral 23 between the bore 17b and the screws 11, 11 is larger than on the upstream side.

The twin screw extruder 2C according to the present embodiment is also characterized by the screws 11, 11. That is, flights are formed in the screws 11, 11 at or near the reinforcing fiber inlet 13C such that a transport force in these sections is larger as compared with other sections. As a result, the starvation section 26, in which resin pressure is reduced, is formed. As for shapes of the flights which enhance the transport force, for example, a depth of a groove between the flights may be increased or a width of the flights may be reduced. In the present embodiment, a pitch of the flights is set to be larger than other portions so as to enhance the transport force. In the present embodiment, the screws 11, 11 are double flights in the starvation section 26.

The reinforcing fiber supply device 3 includes a reinforcing fiber roll 37 on which a rope-shaped reinforcing fiber bundle, that is, roving (reinforcing fiber) is wound in a roll shape. Although not shown in FIGS. 5(a) to 5(c), the roving, that is, a reinforcing fiber 38 is drawn out from the reinforcing fiber roll 37 by a predetermined drawing-out mechanism, and is supplied to the reinforcing fiber inlet 13C. Although the reinforcing fibers are directly supplied in a roving state in the present embodiment, the roving may also be spread and loosened in advance by a predetermined method, that is, the reinforcing fibers may be opened and supplied. Further, the reinforcing fibers may also be cut into a predetermined length and supplied. A side feeder or the like may be provided to supply the reinforcing fibers by a fixed amount.

In the present embodiment, the molding die 4 is a die for molding a molded article by compression molding. The mold clamping device 5 for clamping the molding die 4 performs the mold-clamping by a toggle mechanism or a mold-clamping cylinder.

A molding method of obtaining a fiber-reinforced thermoplastic resin and molding a molded article by the molding device 1C according to the present embodiment will be described. In the twin screw extruder 2C according to the present embodiment, the screws 11, 11 are rotated to supply thermoplastic resin pellets from the hopper 12. The pellets are melted in the cylinder 9 and sent forward. Specifically, the pellets are melted in a section indicated by reference symbol R3 in FIG. 5(a), that is, in a melting section R3. Pressure of molten resin is reduced in the starvation section 26. Since the resin pressure is reduced, the reinforcing fibers can be easily supplied from the reinforcing fiber inlet 13C. Ina section indicated by reference symbol R4, that is, in a resin and reinforcing fiber kneading section R4, the molten resin and the reinforcing fibers are kneaded. Although the reinforcing fibers are cut by a shearing force of kneading or the like, since the clearance between the bore 17b of the cylinder 9 and the screws 11, 11 is increased in this section and the barrel chip 21 is provided only on a lower side, the reinforcing fibers are not cut too finely.

The reason why the reinforcing fibers are hardly cut in the twin screw extruder 2C according to the present embodiment will be described with reference to FIGS. 6(a) and 6(b). In an example shown in FIG. 6(a), the relatively long reinforcing fiber 38 is wound around the two screws 11, 11. In this way, the reinforcing fiber 38 is not in contact with the bore 17b. Accordingly, the reinforcing fiber 38 is not cut due to the relationship thereof with the bore 17b. That is, in the resin and reinforcing fiber kneading section R4, the cutting of the reinforcing fibers is to some extent reduced. As a comparison, a state in which reinforcing fibers are kneaded in the twin screw extruder in the related art is shown in FIG. 6(b). A cylinder 50 is formed with a bore 51 in which two circles partially overlap with each other, and two screws 53, 53 are inserted therein. A clearance between the bore 51 and the screws 53, 53 is small, and barrel chips 54, 54 are formed in an up-down direction. Although a relatively long reinforcing fiber 55 is shown in a state of being wrapped around the two screws 53, 53 in the drawing, the reinforcing fiber 55 is applied with tension at tip ends of the barrel chips 54, 54, and friction with the bore 51 is generated in portions indicated by reference numerals 57, 58. Accordingly, the reinforcing fiber 55 is cut in these portions. In the twin screw extruder 2C according to the present embodiment, cutting does not occur in these portions. Even if the reinforcing fibers are cut, most of the reinforcing fibers have appropriate fiber lengths. Accordingly, when the fiber-reinforced thermoplastic resin is obtained by the twin screw extruder 2C according to the present embodiment, reinforcing fibers having appropriate lengths are dispersed in the resin.

Subsequently, a molding method will be described. As shown in FIG. 5(a), a predetermined amount of the fiber-reinforced thermoplastic resin is extruded from the die 15 and cut by the predetermined cutter. In this way, a lump intermediate molded article is obtained. The lump intermediate molded article is gripped by the robot arm 7, and is carried into a cavity of the molding die 4 whose mold is opened. The mold clamping device 5 is driven to perform compression molding. When the mold is opened after cooling and solidification, a molded article is obtained.

The molding device 1C according to the present embodiment may be modified in various ways. For example, it has been described that the clearance between the bore 17b and the screws 11, 11 of the twin screw extruder 2C is larger on the downstream side than on the upstream side from a position at or near the reinforcing fiber inlet 13C, and at least one of the upper and lower barrel chips 21, 21 is removed from downstream at or near the reinforcing fiber inlet 13C. However, the clearance between the bores 17a, 17b and the screws 11, 11 may be constant. That is, it is possible to reduce the cutting of the reinforcing fibers to some extent merely by removing one of the upper and lower barrel chips 21, 21 on the downstream side from the vicinity of the reinforcing fiber inlet 13C.

The present embodiment may also have another modifications, and a twin screw extruder 2 can be replaced with a single screw extruder including a single screw. That is, an extruder having a configuration as shown in FIGS. 4(a) and 4(b) can be used. Although the clearance between the bore 41 of the cylinder 40 and the screw 42 is reduced in an upstream section of the reinforcing fiber inlet of the extruder, that is, in the melting section, as shown in FIG. 4(a), a diameter of the bore 41 is slightly larger and the clearance between the bore 41 and the screw 42 is increased in a section on the downstream side from a position at or near the reinforcing fiber inlet, that is, in the resin and reinforcing fiber kneading section, as shown in FIG. 4(b). As a result, the reinforcing fibers are not excessively cut when the resin and the reinforcing fibers are kneaded. Although it has been described that diameters of the bores 17b, 41 are increased to increase the clearances between the screws 11, 42 and the bores 17b, 41 in the twin screw extruder 2C according to the present embodiment and the single screw extruder according to the other embodiment, the clearances can be increased also by reducing diameters of the screws 11, 42. The clearance between the bore of the cylinder and the screw, which is increased on the downstream side from a position at or near the reinforcing fiber inlet 13C, may also be reduced from a predetermined downstream position. This makes it easy to adjust the fiber length of the reinforcing fibers to the appropriate length.

Although it has been described in the present embodiment that the molded article is molded by extruding the lump intermediate molded article from the twin screw extruder 2C, and performing compression molding, the molded article may also be molded by a molding method of injecting the same into a mold-clamped molding die. For example, a twin screw extruder or a single screw extruder and a plunger type injection device are combined and connected by a predetermined flow path switching valve. A fiber-reinforced thermoplastic resin is obtained and extruded by the twin screw extruder or the single screw extruder, and weighed in the plunger type injection device. A molding die is clamped, and the flow path switching valve is switched to inject the fiber-reinforced thermoplastic resin from the plunger type injection device into the die. When the mold is opened after cooling and solidification, a molded article is obtained.

The reinforcing fibers used in the first to third embodiments described above can also be modified. For example, carbon fibers, glass fibers, ceramic fibers, or the like can be employed.

EXAMPLE

In the third embodiment described above, an experiment was conducted so as to confirm that the reinforcing fibers in the resin were not excessively short and had appropriate lengths.

<Experiment Method>

A molded article A was obtained by using the molding device 1C including the twin screw extruder 2C having a configuration as shown in FIG. 5(a). Nylon 6 was adopted as the thermoplastic resin, carbon fibers were adopted as the reinforcing fibers, and the reinforcing fibers were set to have a volume ratio of 30% with respect to the resin. The molded article A was a flat plate of 300 mm×300 mm×3 mm. Meanwhile, a fiber-reinforced thermoplastic resin is obtained by using the same materials and using the twin screw extruder in the related art, extruded and subjected to compression molding to obtain a molded article B having the same shape as that of the molded article A. That is, the resin and the reinforcing fibers were kneaded by a twin screw extruder as shown in FIG. 6(b) to obtain the fiber-reinforced thermoplastic resin and the molded article B.

Each of the molded article A and the molded article B was put in an electric furnace and burned at 450° C. for a predetermined time, and the nylon 6 was evaporated to leave only the carbon fibers. A photograph of the carbon fibers contained in the molded article A is shown in FIG. 7, and a photograph of the carbon fibers contained in the molded article B is shown in FIG. 8. Carbon fibers having a length of 0.2 mm or more were picked up from the carbon fibers of the molded articles A, B, and an average fiber length was calculated. The carbon fibers of the molded article A had an average fiber length of 12 mm, while the carbon fibers of the molded article B had an average fiber length of 5 mm.

<Discussion>

From FIGS. 7 and 8, it can be seen that the carbon fibers contained in the molded article A include a large number of carbon fibers which have longer fiber lengths than that of the molded article B. The average fiber length of the carbon fibers was also found to be 2.4 times longer than that of the molded article B. When the resin and the reinforcing fibers are kneaded by the twin screw extruder 2C according to the present embodiment, the cutting of the reinforcing fibers can be to some extent reduced, and it was confirmed that there were a large number of reinforcing fibers having predetermined fiber lengths, which is effective for improving strength of the molded article.

Although the invention has been described in detail with reference to specific embodiments, it will be apparent to those skilled in the art that various changes and modifications can be made without departing from the spirit and scope of the invention. This application is based on Japanese Patent Application No. 2017-184641 filed on Sep. 26, 2017 and Japanese Patent Application No. 2017-195576 filed on Oct. 6, 2017, the contents of which are incorporated herein by reference.

REFERENCE SIGNS LIST

1A Molding device
1B Molding device (injection molding machine)
1C Molding device
2A Twin screw extruder
2B Injection device
2C Twin screw extruder
3 Reinforcing fiber supply device
4 Molding die
5 Mold clamping device
6 Reinforcing fiber supply device
7 Robot arm
9 Cylinder
11 Screw
12 Hopper
13A First reinforcing fiber inlet
13B Reinforcing fiber inlet
13C Reinforcing fiber inlet
14A Second reinforcing fiber inlet
15 Die
17a, 17b Bore
18, 19 Reinforcing fiber roll
21 Barrel chip
24 Clearance
25, 26 Starvation section
27 Kneading section
28, 29 Reinforcing fiber
31 Injection nozzle
32, 33 Reinforcing fiber roll
34, 35 Reinforcing fiber
36 Cutting device
37 Reinforcing fiber roll
38 Reinforcing fiber
40 Cylinder
41 Bore
42 Screw
50 Cylinder
51 Bore
53 Screw
54 Barrel chip
55 Reinforcing fiber

The invention claimed is:

1. A fiber-reinforced thermoplastic resin plasticizing apparatus comprising:
a cylinder;
a screw rotatable in the cylinder; and
a reinforcing fiber supply device including a plurality of fiber reinforcing rolls,
wherein a thermoplastic resin is supplied to the cylinder and melted while reinforcing fibers are supplied, and the thermoplastic resin and reinforcing fibers are kneaded to obtain a fiber-reinforced thermoplastic resin,
wherein the cylinder comprises reinforcing fiber inlets at a plurality of locations in the cylinder,
wherein the reinforcing fiber supply device is configured to input the reinforcing fibers into the reinforcing fiber inlets respectively from the plurality of fiber reinforcing rolls to the plurality of locations at a same time,
wherein a clearance between a bore of the cylinder and a flight of the screw becomes larger on a downstream side than on an upstream side from a predetermined location among the plurality of locations of the reinforcing fiber inlets;
wherein the bore of the cylinder has a shape in which:
at a first position that is downstream of a thermoplastic resin supply and upstream of at least one of the reinforcing fiber inlets, barrel chips are formed at two locations; and
from a second position that is downstream and immediately adjacent to the first position to a third position that is downstream of the at least one of reinforcing fiber inlets, at least one of the barrel chips is cut, the second position being upstream of the at least one of the reinforcing fiber inlets;
wherein the bore from the second position to the third position has a larger cross-sectional area than the bore at the first position.

2. The fiber-reinforced thermoplastic resin plasticizing apparatus according to claim 1,
wherein the plasticizing apparatus comprises a twin screw extruder having two screws,
wherein a bore of the cylinder has a cross-sectional shape in which two circles of a same size partially overlap each other, thereby forming inward barrel chips at two locations of the bore, and
wherein on a downstream side from one predetermined location among the plurality of locations of the reinforcing fiber inlets, the bore has a shape in which at least one of the barrel chips is cut.

3. The fiber-reinforced thermoplastic resin plasticizing apparatus according to claim 1, wherein in a section between the reinforcing fiber inlet located at one predetermined location and the reinforcing fiber inlet located at another one location, a flight, which has a larger shearing force during kneading as compared with another section, is formed in the screw.

4. A fiber-reinforced thermoplastic resin extruder, which is a twin screw extruder comprising:
a cylinder having a bore, the bore having a cross-sectional shape in which two circles of a same size are partially overlapped with each other by intersecting at two points, thereby forming inward barrel chips at two locations; and
two screws rotatably inserted into the bore,
wherein a thermoplastic resin is supplied to the cylinder and melted while reinforcing fibers are supplied, the thermoplastic resin and the reinforcing fibers are kneaded to obtain a fiber-reinforced thermoplastic resin, and the obtained fiber-reinforced thermoplastic resin is extruded by the extruder,
wherein the cylinder includes a reinforcing fiber inlet, to which the reinforcing fibers are supplied, at a predetermined position in the cylinder, and
wherein the bore has a shape in which:
at a first position that is downstream of a thermoplastic resin supply and upstream of the reinforcing fiber inlet, the barrel chips are formed at two locations; and
from a second position that is downstream and immediately adjacent to the first position to a third position that is downstream of the reinforcing fiber inlet, at least one of the barrel chips is cut, the second position being upstream of the at least one of the reinforcing fiber inlets;
wherein the bore from the second position to the third position has a larger cross-sectional area than the bore at the first position.

5. The fiber-reinforced thermoplastic resin extruder according to claim 4, wherein a clearance between the bore of the cylinder and the screw becomes larger on a downstream side than on the upstream side from the second position.

6. The fiber-reinforced thermoplastic resin plasticizing apparatus according to claim 1, wherein a section at one of the reinforcing fiber inlets of the cylinder is a starvation section in which resin pressure decreases.

7. The fiber-reinforced thermoplastic resin plasticizing apparatus according to claim 1,
wherein the extruder comprises a cutter, and
wherein the reinforcing fibers are cut into a predetermined length by the cutter and supplied to the reinforcing fiber inlet.

8. The fiber reinforced thermoplastic resin extruder according to claim 4, wherein a section at the reinforcing fiber inlet of the cylinder is a starvation section in which resin pressure decreases.

9. The fiber-reinforced thermoplastic resin extruder according to claim 4,
wherein the extruder comprises a cutter, and
wherein the reinforcing fibers are cut into a predetermined length by the cutter and supplied to the reinforcing fiber inlet.

10. The fiber-reinforced thermoplastic resin extruder according to claim 4, wherein threads of each of the two screws are configured to intermesh with each other where the two circles are partially overlapped with each other.

* * * * *